Nov. 30, 1926. 1,608,490
P. CATUCCI
LEVEL WINDING DEVICE FOR FISHING REELS
Filed Feb. 26, 1925  2 Sheets-Sheet 1
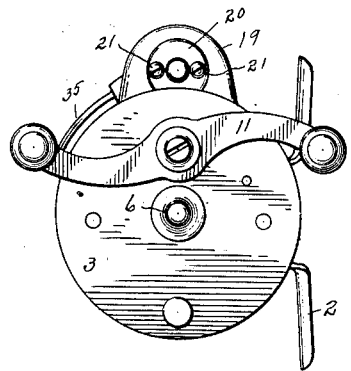
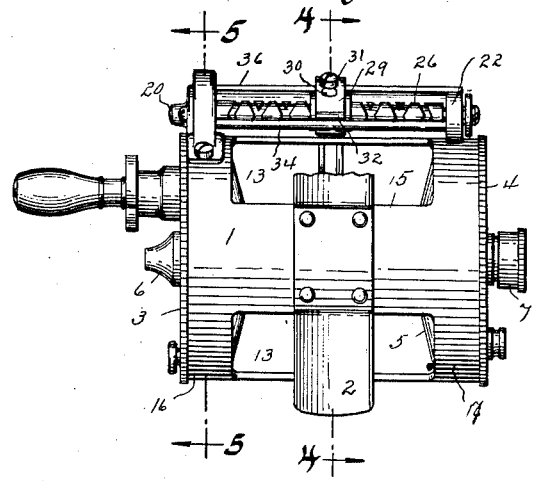
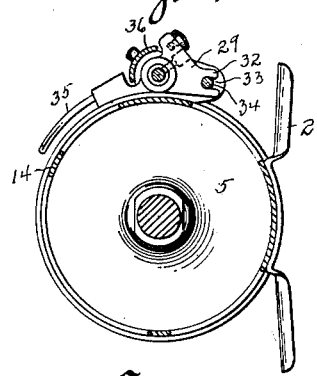
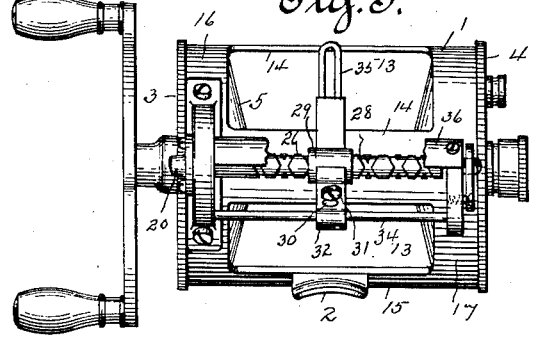
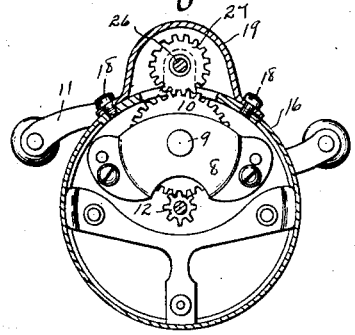
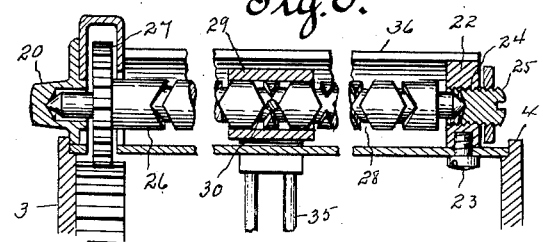
INVENTOR
Pliny Catucci
BY
Louis M. Sanders
ATTORNEY Nov. 30, 1926.

P. CATUCCI 1,608,490

LEVEL WINDING DEVICE FOR FISHING REELS

Filed Feb. 26, 1925   2 Sheets-Sheet 2

INVENTOR
Pliny Catucci
BY
Louis M. Sanders
ATTORNEY

Patented Nov. 30, 1926.

1,608,490

UNITED STATES PATENT OFFICE.

PLINY CATUCCI, OF NEWARK, NEW JERSEY.

LEVEL-WINDING DEVICE FOR FISHING REELS.

Application filed February 26, 1925. Serial No. 11,675.

My present invention is designed to provide the ordinary fishing reel with means for evenly and uniformly distributing the line over the spool as it is wound thereon, so that there is less danger of tangling and a smoother paying out of the line when casting.

In the drawings, I have shown two forms or embodiments of my improvement—the first one showing the traversing mechanism as being positively driven by the spool driving gear, and the other showing the entire traversing mechanism as detachable from the reel frame, while traverse screw is relatively stationary and has mounted thereon a small sheave, in the groove of which the line is carried, and by which the line is caused to traverse back and forth as it rotates the sheave.

In so far as my invention relates to the second form above noted, it is to be considered as a division of my prior application Ser. No. 730,815, filed August 8, 1924 now Patent No. 1,575,619.

In the accompanying drawings forming a part hereof,

Fig. 1 is an end view of my improved reel, showing the level winding mechanism mounted thereon.

Fig. 2 is a bottom plan view of the reel.

Fig. 3 is a front elevation of the same.

Fig. 4 is a section on line 4—4 of Fig. 2.

Fig. 5 is a section on line 5—5 of Fig. 2.

Fig. 6 is an enlarged view of the traverse screw, with its associated parts.

Similar reference numerals refer to like parts throughout the specification and drawings.

Figure 7:
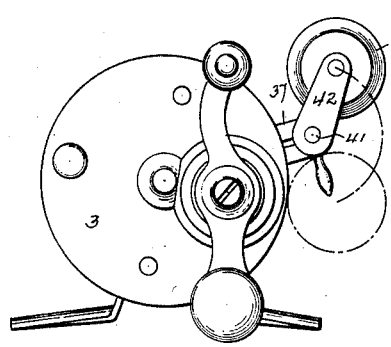
Fig. 7 is a view similar to Fig. 1, but with the second form of the traverse mechanism mounted upon the reel.

The reel is made up of the frame or cage 1, to which the foot plate 2 is rigidly attached, and in which the head plate 3 and the back plate 4 are detachably secured. The usual spool 5 is mounted to rotate in the bearings 6 in the head plate and 7 in the back plate. The head plate 3 is provided with the bridge 8, in which the stub shaft 9 is rigidly mounted, and upon which the main driving gear 10 is sleeved, with its crank 11 secured thereto. The spool 5 has the pinion 12 secured to its spindle to engage and be driven by the gear 10. The frame 1 is made of heavy tubing of suitable size for the purpose, having the sides cut out as at 13 to form the connecting posts 14 and the foot plate post 15, to which the foot plate 2 is rigidly secured in any suitable manner. The means for securing the head and back plates into the ends of the frame 1 may be any of the well known fastening devices used for the purpose, or it may be the form shown in the drawing, and particularly described in my Patent No. 1,506,162, dated August 26, 1924. I have not deemed it necessary to specifically describe the fastening means, since it forms no part of my present invention.

When the frame 1 is formed as above described, it will be noted that the two end rings 16, 17 are formed, to which the head and back plates 3, 4 are respectively secured. These rings also serve as supports for the level winding mechanism of one form of my improvement. Upon the head ring 16, I secure by means of the screws 18, the housing 19 which serves as a support for the pivot bearing 20, mounted upon its outer side and secured in place by the screws 21. Upon the back ring 17, I secure the standard 22 by means of the screw 23, said standard being provided with a screwthreaded aperture 24, into which the adjustable pivot bearing 25 is screwed. Mounted between the pivot bearings 20, 25, is the traverse shaft 26, having at one end the pinion 27 rigidly mounted thereon in mesh with the driving gear 10, and having the traverse thread or groove 28 cut in the greater portion of its length. Upon the traverse shaft 26 is mounted the traverse slide 29, having a pin 30 inserted therein and so arranged that the point of said pin will enter the groove 28, so that as the shaft is rotated, the slide will traverse back and forth upon the shaft. In order to secure the pin 30 against escape, I provide a screw 31 in the slide 29, with the head of said screw lapping over the exposed end of the pin 30. In order to prevent the slide 29 from turning with the shaft 26, I provide said slide with a lateral extension 32 having an open slot 33 in its free end to take over the guide rod 34, which extends between the housing 19 and the standard 22. The upper end of the slide 29 is provided with a wire loop 35, which is curved to conform to the contour of the reel frame. The upper end of said loop is immediately adjacent to one of the posts 14, and as the slide traverses the shaft 26, the end of said loop will travel parallel with said post, which will serve as an abutment to prevent the accidental bending of said loop.

In order to protect the traverse shaft 26 and its delicate traverse groove 28 from injury, I provide the cover or guard 36 for the same, mounting one end of said guard upon the standard 22, while the other end is secured to the housing 19.

In operation, the line is threaded through the loop 35, and wound upon the spool 5 in the usual manner, by means of the crank. The traverse shaft 26, being geared directly to the driving gear 10, will cause the slide 29 to traverse back and forth upon the shaft 26, and thus lay the line uniformly upon the spool.

Figure 8:
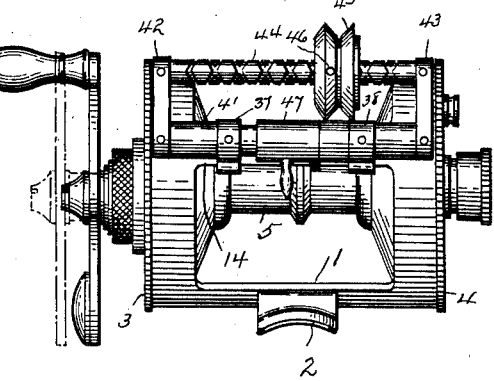
Fig. 8 is a front elevation of the same.
Figure 10:
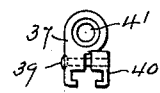
Figs. 10, 11 and 12 show details of the construction of the means for detachably mounting the traverse frame upon the reel.
Figure 11:
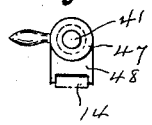
Figure 12:
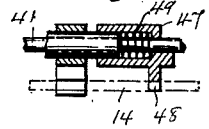
Figure 9:
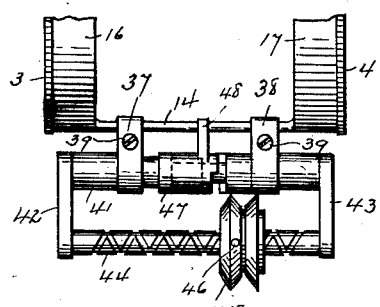
Fig. 9 is a plan view of the same.

In the use of a reel of the type described, it often happens that the fisherman does not wish to use the level winding mechanism; that is to say, he wishes to throw it out of gear, or possibly detach it from the reel altogether. To meet the demand for such a level winding device, I have designed the detachable mechanism shown in Figs. 7 to 12.

The reel frame and its usual parts are the same as described above. Upon the forward frame post 14 are the two clamping brackets 37, 38, secured in place by means of the screws 39, passing into the clamping nuts 40, so as to secure said brackets rigidly upon said frame. In the outer ends of the brackets is the rock shaft 41, to the ends of which are secured the two arms 42, 43, which serve as supports for the double threaded traverse shaft 44, upon which is mounted the sheave 45 to traverse said shaft from end to end. The sheave has an internal tooth 46 which engages the double thread of the shaft, so that when a line is run over the peripheral groove of said sheave, it will rotate and its internal tooth will cause it to traverse the shaft thereby uniformly and evenly distributing the line upon the spool. The rock shaft 41 may be oscillated so as to carry the shaft 44 from its operative position shown in Fig. 7 to the inoperative position, shown in dotted lines. In order to accomplish this result, and at the same time provide means for locking the rock shaft in the operative position, I mount upon the rock shaft a sliding clutch mechanism in the form of a spring sleeve 47 guided by the arm 48 whcih engages the frame post 14, so that by pulling back said sleeve against its internal spring 49, the arms 42, 43 will occupy the position shown in Fig. 9. When it is desired to restore the mechanism to operative position, it is only necessary to turn the rock shaft 41 and the traverse shaft 44 back into its upper position, when of course the spring sleeve 47 will snap back into place, and thus lock the parts in operative position and ready to distribute the line upon the spool. The use of the level winding mechanism as just described is most frequent in bait casting, when the operator desires a free line; and when he wishes to wind in, the rock shaft is turned up into operative position. When the reel is used for any other purpose than bait casting or fly casting, it may be desirable to dispense with the level winding mechanism; in this case it is only necessary to loosen the screws 39, and remove the level winder. The making of the level winder detachable has the additional advantage of being able to attach it to other reels, should the one in use get out of order.

While I have disclosed the preferred forms of my invention, yet I do not wish to be considered as confining my improvement to the exact forms as shown, since minor changes in detail coming within the scope of my invention will readily suggest themselves to others skilled in the art. I desire, therefore, that the appended claims shall be interpreted to include such modifications as may come within the spirit and scope of my invention.

I claim:—

1. In a fishing reel, the combination with a cylindrical reel frame with a line spool rotatably mounted therein, and a rod extending between the ends of said frame at its periphery, of, a level winding device detachably clamped upon said rod, said device comprising a pair of clamping brackets, a rock shaft mounted in said brackets, a pair of supporting arms projecting laterally from the ends of said shaft, a reversely threaded traverse shaft secured in the free ends of said arms, and a peripherally grooved line guiding sheave rotatably mounted upon said shaft said sheave having an internal stud engaging said traverse thread, whereby the winding in of a line upon said spool will cause said sheave to rotate upon and traverse said shaft from end to end to uniformly and evenly lay said line upon said spool.

2. In a fishing reel, the combination with a reel frame with a line spool rotatably mounted therein, of a pair of clamping brackets detachably clamped to an element of said frame, a rocking frame pivotally mounted in said brackets, a rotatable and laterally reciprocable sheave mounted in said rocking frame, and means connecting said rocking frame with said reel frame for locking said rocking frame in operative position and for permitting the same to swing into inoperative position.

3. In a fishing reel the combination with a reel frame, having a line spool mounted therein, a rod extending between the frame end element, of a level winding device pivotally mounted upon said rod, said device comprising a sheave, a rocking frame in which said sheave is pivotally mounted and laterally reciprocable, and a locking device mounted upon said rocking frame for locking the same in operative position or inoperative position selectively.

PLINY CATUCCI.